United States Patent [19]

Blount

[11] Patent Number: 5,075,343
[45] Date of Patent: Dec. 24, 1991

[54] FLAME-RETARDANT POLYURETHANE FOAM UTILIZING BORIC ACID

[76] Inventor: David H. Blount, 6728 Del Cerro Blvd., San Diego, Calif. 92120

[21] Appl. No.: 437,105

[22] Filed: Nov. 16, 1989

[51] Int. Cl.$^5$ .................. C08J 9/14; C08G 18/02; C08G 77/56; C09K 21/02
[52] U.S. Cl. ............................. 521/85; 521/103; 521/123; 521/126; 521/127; 521/152; 521/155; 521/159; 252/609
[58] Field of Search ............... 521/85, 103, 123, 126, 521/127, 152, 155, 159; 252/609

[56] References Cited

U.S. PATENT DOCUMENTS

| | | | |
|---|---|---|---|
| 4,291,129 | 9/1981 | Kennedy | 521/103 |
| 4,317,752 | 3/1982 | Blount | 521/159 |
| 4,831,062 | 6/1989 | von Bonin | 521/103 |

*Primary Examiner*—John Kight, III
*Assistant Examiner*—John M. Cooney, Jr.

[57] ABSTRACT

Flame retardant polyurethane foams are produced by mixing and reacting a polyol, a low molecular weight compound with 1 or more active hydrogen, an organic polyisocyanate and an acidic boron compound in the presence of an organo-metal urethane catalyst.

The flame-retardant polyurethane foam may be used for thermal and sound insulation, for cushioning and for molding useful objects.

24 Claims, No Drawings

FLAME-RETARDANT POLYURETHANE FOAM UTILIZING BORIC ACID

BACKGROUND OF THE INVENTION

This invention relates to a process for the production of flame-retardant polyurethane foamed products by mixing and reacting an acid boron salt forming compound, a polyol, a low molecular weight compound containing 1 or more active hydrogens that will react with a polyisocyanate and in the presence of an organo-metal urethane catalyst.

The production of polyurethane products are well known in the Arts and many types of flame-retardant chemicals have been used in the process. It is also known in the Arts that salts of boric acid are useful as a flame-retardant but require the addition of other flame-retardants, therefore they are not very useful. In the novel process of this invention, only small amount of acid boron compounds are necessary to produce a flame-retardant product because the molecules of the boric acid are small and very well distributed throughout the product. The problem in the past encountered with the use of boric acid in the production of polyurethane foams was that it is an acidic compound, therefore a negative catalyst and interferes with the curing of the polyurethane foams. The curing time is so prolonged in most formulation that the foam collapses and it takes days for the mixture to cure. This prolonged curing time is especially pronounced in the production of flexible foams utilizing polyols with a hydroxyl number of less than 200 and tolylene diisocyanates or polymeric MDI. In the production of rigid polyurethane foams using polyols with a hydroxyl no. above 300, polymeric MDI and boric acid there is a slowing down of the curing process but a foam product can be produced without using a low molecular weight compound or an organotin catalyst but a better foam is produced when using them.

I have discovered that the negative catalytic effect of boric acid may be over come by the utilization of a low molecular weight compound that contains active hydrogens which will rapidly react with a polyisocyanate in the presence of an organo-metal polyurethane catalyst. The anhydrous boric acid powder will also promote the production of a gas which foams the polyurethane product. The exact chemical reaction is not known but it appears that some of the boric acid is esterified with the hydroxyl radicals and water is produced in the process. The water reacts with the isocyanate radical to produce $CO_2$ which acts as a foaming agent. When boric acid is heated to above 100° C., water is given off. The need to use halogenated blowing agents is greatly reduced. In the process of this invention, low cost and readily available compounds, such as boric acid, are utilized and there is an improvement in the cost of the product, in the amount of flame-retardant needed, and in the production of inexpensive flame-retardant compounds. It takes an amount at least 3 to 5 times more when the salt of acid boron compound is added to the reacting mixture instead of boric acid to produce flame-retardant polyurethane products. The flame-retardant boric acid of this invention is less expensive and at least equal to, or better than, the commercially available flame-retardant agents for polyurethane products in flame-retardant properties.

The polyurethane products may contain as little as 7 percent by weight of boric acid and have good flame-retardant properties. The amount of acid boron compound that would normally be used ranges from 7 percent to 25 percent of the reactive mixture to produce flame-retardant polyurethane products.

In the production of flexible polyurethane-boric acid foams it is necessary to use a low molecular weight compound containing an active hydrogen and an organo-metal urethane catalyst with the organic triol and polyisocyanate in order to produce a useful flexible foam. Other urethane catalyst such as amine catalyst may also be used in some products.

DETAILED DESCRIPTION

The flame-retardant polyurethane foam products may be produced by admixing and reacting the following components.

A. acid boron compound, 10 to 100 parts by weight;

B. compound with a molecular weight of below 100 and containing 1 or more active hydrogens that will react with an isocyanate radical, up to 20 parts by weight;

C. polyhydroxyl organic compound (polyol) with a molecular weight of above 100, 1 to 200 parts by weight;

D. organic compound containing 2 or more isocyanate radicals, 25 to 100 parts by weight;

E. organo-metal compound, up to 10 percent by weight based on reactants.

Component A

Any suitable acidic boron compound may be used in this invention. Suitable acidic boron compounds include, but are not limited to orthoboric acid, metaboric acid, tetraboric acid, boric oxide plus water, boron halides plus water and mixtures thereof. Boric acid powder is the preferred acidic boron compound.

Component B

Any suitable low molecular weight compound, preferable mol. wt. of below 100, which has active hydrogens that will react with organic isocyanate radicals and preferable with a rapid reaction onset to over come the negative catalytic effect of the acidic boron compound. Suitable low molecular weight compounds include, but are not limited to water, alcohols, polyhydroxyl organic compounds, amines, polyamines, amides, amino compounds, compound with thiol groups, polyesters containing hydroxyl groups, polyethers containing hydroxyl groups, polyacetals containing hydroxyl groups, polycarbonates with hydroxyl groups, polyesteramides, aminoalcohols, aminoplasts, phenoplasts, aldehydes and mixtures thereof. Other useful compounds are listed in Component C.

Low molecular weight polyhydroxyl compounds are preferred which include, but are not limited to ethylene glycol, propylene-1-2 and 1,3-glycol, butylene-1,4- and -2,3-glycol, glycerol, trimethylol propane, diethylene glycol, dipropylene glycol, 2-methylpropane-1,3-diol and mixtures thereof. Ethylene glycol is the preferred low molecular weight compound.

Component C

Any suitable compound that contains at least one active hydrogen, preferably 2 or more active hydrogen-containing compounds, that will react with isocyanate radical may be used in this invention.

The organic compounds having reactive hydrogens are understood to be not only compounds which contain amino groups, thiol groups or carboxyl groups, but particularly also polyhydroxyl compounds.

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterphthalate and bisglycol terephthalate. Any suitable polyhydric alcohol may be used such as, for example, ethylene glycol; propylene-1-2 and -1,3-glycol; butylene-1,4- and -2,3-glycol; propylene-1,2- and -1,3-glycol; butylene-1,4- and -2,3-glycol; hexane-1,6-diol; octane-1,8-diol; neopentyl glycol; cyclohexanedimethanol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as -caprolactone, or hydroxycarboxylic acid such as hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of BF$_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenylmethylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

Any suitable compound which contains one or more active hydrogens may be used in this invention such as alcohols, thioalcohols, phenols, thiophenols, aldehydes, carboxylic acid bromides, sulphonic acid chlorides, organic esters, ethers, thioethers, halomethyl compounds, ketones, nitriles, sulphonic acids, amines and mixtures thereof. Compounds which contain one OH group and/or at least one other hydrophilic and/or polar group which has the general formulae:

RSH, RCH$_2$CL, RCH$_2$Br, RCH$_2$I, RCN, RNO$_2$,

RCOCL, RCOBr,

RSO$_2$CL, RCOOH, RS$_3$OH, RCOO$^-$,

RSO$_3^-$, ROR, CH$_3$—C—R,

O wherein R denotes a methyl, ethyl or propyl group, may be used in this invention.

Any suitable epoxy compound may be used in this invention. Suitable epoxy compounds include but are not limited to ethylene oxide, propyleneoxide, butylene oxide, tetrahydrofuran, styrene oxide, epihalohydrins and polyepoxy compounds. Polyepoxy compounds are preferred, but not limited to, a list of suitable polyepoxy compounds is found in U.S. Pat. No. 4,292,413 page 2-4 and is incorporated into this application. The polyepoxy compounds are well known in the Arts and are the preferred epoxy compound.

Component D

Any suitable organic compound containing at least 2 isocyanate radicals may be used in this invention. Suitable organic polyisocyanates may be aliphatic, cycloaliphatic, araliphatic, aromatic and heterocyclic polyisocyanates are well known in the arts. Suitable polyisocyanates which may be employed in the process of the invention are exemplified by the organic diisocyanate which are compounds of the general formula:

wherein R is a divalent organic radical such as an alkylene, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4-6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commercially readily available polyisocyanate, e.g., tolylene-2,4 and -2,6-diisocyanates and any mixtures of these isomers ("TDI") Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable compound which contains 1 or more isocyanate radicals and one or more unsaturated bonds which will polymerize may be used in this Invention. The unsaturated oliphatic isocyanates which has double-bond vinyl functionality in the same molecule are preferred. Hydroxyethyl methacrylate may be reacted with tolylene diisocyanate or with NCO-terminated prepolymer to produce compound with vinyl functionality and isocyanate functionality in the same molecule. The double-bond vinyl radical may be cured with free-radical initiators such as an organic hydroperoxide. The isocyanate radical may be cured and foamed with a compound containing attached water.

Component E

Any suitable organo-metal compound which will act as a urethane catalyst may be used in this invention, such as cadmium, antimony, tin, cobalt, zinc, titanium, particularly organic tin compounds, etc. and mixtures thereof. Organo-tin-sulfur compounds may also be used.

The organic tin compounds used are preferably tin-(II) salts of carboxylic acids such as tin(II)-acetate, tin(II)-octoate, tin(II)-ethyl hexoate and tin(II)-laureate and the dialkyl tin salts of carboxylic acids such as dibutyl tin diacetate, dibutyl tin dilaurate, dibutyl tin maleate or dioctyl tin diacetate.

The flame-retardant polyurethane products may be produced under any suitable physical condition. The components may be mixed in any suitable physical condition. The components may be mixed in any suitable manner. They may be mixed simultaneously or Components A and B may be mixed with Component C and/or Component D. It is preferable to mix Components A and B in Component C, then mix with Component D at ambient temperature and pressure. The optional component may be added to the mixture of A, B and C before adding Component D. Optional components include, water, initiator, filler, diluent, blowing agent, emulsifying agent, activator, foam stabilizer, modifying compounds, etc.

The proportions of the reactants and other compounds used in this invention may vary within the following ratios:
a) 10 to 100 parts by weight of Component A;
b) up to 20 parts by weight of Component B;
c) 1 to 200 parts by weight of Component C;
d) 25 to 100 parts by weight of Component D;
e) Up to 50 percent by weight of an inert liquid, boiling in the range of $-25°$ C. to 80° C.;
f) Up to 10 percent by weight of activator (polyurethane catalyst);
g) Up to 20 percent by weight of foam stabilizer;
h) Up to 20 percent by weight of emulsifying agent;
i) Up to 300 percent by weight of inorganic or organic particulate or pulverulent material;
j) Up to 300 percent of a modifying compound;
k) Up to 25 percent by weight of phase-change material;
l) Up to 5 percent by weight of a free-radical-initiator.

Percentages are based on weight of the reaction mixture.

When producing foams by the process according to the invention, blowing agents may be used, even when using NCO-prepolymers which give rise to the evolution of carbon dioxide. The blowing agents which are suitable for this purpose are inert liquids boiling within a range of $-25°$ C. to $+80°$ C. and preferably $-15°$ C. to $+40°$ C. They are used in quantities of 0–50 percent by weight, preferably 2–30 percent by weight when needed, based on the reaction mixture.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 455 and 507 to 510.

Catalysts which promote the reaction of isocyanates with reactive hydrogen are also often used according to the invention in catalytic amounts. Catalysts known per se may be used, e.g., tertiary amines such as triethylamine, tributylamine, N-methyl-morpho-line, N-ethylmorphonine, N-cocomorpholine, N,N,N',N'-tetramethylethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-dimethyl cyclohexylamine, N,N,N',N'-tetramethyl-1,3-butane diamine, N,N-dimethyl-B-phenyl ethylamine, 1,2-dimethyl imidazole or 2-methyl imidazole.

Suitable tertiary amine catalysts with hydrogen atoms which are reactive with isocyanate groups include, e.g., triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethylaminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Other representatives of catalysts which may be used according to the invention and details concerning the action of the catalysts have been described in Kunststoff-Handbuch, Volume VII, published by Vieweg and Hochtlen, Carl-Hanser-Verlag, Munich, 1966, e.g., on pages 96 to 102.

The polyurethane catalysts or activators are generally used in any catalystic amount, preferably in a quantity up to 10 percent by weight, based on the reactive mixture.

A surface-active additive (emulsifiers and foam stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acid with amines, e.g., oleic acid diethylamine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Solid inert fillers may be added to the components. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable initiator which will promote the polymerization of a solution of a vinyl monomer may be used in this invention. The controlled polymerization of the vinyl monomer in a polyol, in order to yield fully cured solids, usually required the use of an initiator. Only a catalytic amount of an initiator is needed and the amount may vary up to 1% by weight based on the vinyl monomer.

Any suitable free-radical initiator, such as organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photopolymerization may be used in certain cases.

Suitable organic peroxide initiators include, but are not limited to, acetyl benzoyl peroxide, methyl ethyl ketone peroxide, cyclohexanone peroxide, cyclohexyl hydroperoxide, 2,4-dichlorobenzyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or naphthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

Epoxy catalyst may be used with the epoxy compounds. Suitable epoxy catalyst include amines, Lewis acids, alkali metal oxides and hydroxides and mercaptan-terminated liquid compounds. A list of these compounds may be found in U.S. Pat. No. 4,383,089 pages 5-12 and is incorporated into this Application.

Any suitable modifying or additive compound may be used in the reaction of this invention to vary properties of the product. Typical modifying compounds include polyepoxides, polysulfides, polymers, alkali sulfides, aminoplasts, phenoplasts, fatty or rosin acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc. and mixtures thereof.

Any suitable phase-change materials may be added to the components of this invention. Phase-change materials are materials that melt to store heat and freeze (solidify) to give up heat. The melting and freezing of the material takes place over a narrow temperature range, similar to ice. Heat is stored during the day and released at night when temperature drops. Suitable phase-change materials include, but are not limited to, salt hydrates, crystalline alkyl hydrocarbons (paraffin waxes), fatty acids, fatty acid esters, poly(ethylene glycol) waxes and mixtures thereof. Flame retardants may be added to change the melting and freezing points. The various phase-change materials may be mixed to obtain the desired melting and freezing points.

Any suitable flame-retardant agent may be used in this invention such as alkali metal phosphate compounds, alkaline metal earth phosphate compounds, ammonium phosphates and other salts of phosphoric acid, halogenated paraffins, organic phosphorus containing compounds, organic phosphorus and halogen containing compound and other flame-retardant agents commonly known in the Arts. Other substances such as plasticizers, dyes, stabilizers, negative catalyst, pigments, stabilizers against aging and weathering, fungicidal and bacteriocidal substances may be used in this invention. Details about methods of using these additives and their action may be found in Kunststoff-Handbuch, Volume VI; published by Vieweg and Hochtlen, Carl-Hansen-Verlag, Munich 1966, e.g. on pages 103 to 113.

Polyurethane products have many uses and these uses are well known in the Arts. The polyurethane foam produced by this invention may be used for cushioning, packaging, sound and thermal insulation, as an adhesive, as construction material, as shoe soles, as coating agent, as cavity filler, etc.

The reactive components may be mixed and sprayed in any of the well known polyurethane foaming machines to produce in-situ insulation. The components may be used in a two component system, mixed then poured in place such as in boats for flotation. The mixed components may be pumped into molds to form auto or furniture cushions, art objects, building materials, insulation, paneling, etc.

The object of the present invention is to provide a novel process of producing flame-retardant polyurethane products. Another object is to produce novel flame-retardant polyurethane products. Another object is to produce novel flame-retardant polyurethane products using small amounts of low-cost flame-retardant agents. Still another object is to produce flame-retardant polyurethane products that may be used for thermal insulation, structural purposes, sound proofing, shock-resistant packaging, cushions, surface coating, adhesives, casting material, putty, etc.

DESCRIPTION OF PREFERRED EMBODIMENTS

My invention will be illustrated in greater detail by the specific examples which follow, it being understood that theses preferred embodiments are illustrative of, but not limited to, procedures which may be used in the production of flame-retardant polyurethane products. Parts and percentages are by weight unless otherwise indicated.

EXAMPLE 1

About 40 parts by weight of boric acid powder, 100 parts by weight of a polypropylene triol, (mol. wt. 3,000, hydroxyl no. 56), 3 parts by weight ethylene glycol, 0.5 parts by weight of foam stabilizer (L6202 by Union Carbide) are emulsified then 30 parts by weight of the emulsion is mixed with 0.15 parts by weight of tin octoate and 10 parts by weight of tolylene diisocyanate (TDI 80 by MOBAY). The mixture expands and cures to produce a strong flexible foam of about 1.5 lbs./cu. ft.

The foam was flame-tested after 1 week by using a ½ inch flame from a propane torch. The flame was held about 1 inch from the foam for 15 seconds. The foam slowly burned and the flame traveled superficially and there was a definite decrease in the amount of smoke when compared to burning flexible foam containing no flame-retardant. The foam was self-extinguishing as soon as a superficial char was formed.

EXAMPLE 2

Example 1 is modified wherein 0.2 parts by weight of an amine urethane catalyst (DABCO R8020 by AIR PRODUCTS) is added to the emulsion.

EXAMPLE 3

Example 1 is modified wherein 0.5 parts by weight of water is added to the emulsion.

EXAMPLE 4

Example 1 is modified wherein 15 parts by weight of polymeric MDI (MONDUR MR by MOBAY) is used instead of the tolylene diisocyanate.

EXAMPLE 5

Example 1 is modified wherein the polypropylene triol is replaced with a triol selected from the list below:
a) polypropylene triol, mol. wt. 3,000, hydroxyl no. 42;
b) polypropylene triol, mol. wt. 3,500, hydroxyl no. 49;
c) poly (oxyalkylene) triol, mol. wt. 3,000, hydroxyl no. 58;
d) poly (oxyalkylene) triol, mol. wt. 3,500, hydroxyl no. 49;
e) poly (oxyalkylene) triol, mol. wt. 4,800, hydroxyl no. 35;
f) polypropylene diol, mol. wt. 1,275, hydroxyl no. 88;
g) polypropylene diol, mol. wt. 2,000, hydroxyl no. 56.

EXAMPLE 6

Example 1 is modified wherein different amounts of boric acid are used and selected from the list below:
a) 30 parts by weight
b) 50 parts by weight
c) 70 parts by weight
d) 45 parts by weight
e) 20 parts by weight

EXAMPLE 7

About 30 parts by weight of sucrose polyether polyol, hydroxyl no. 380, 12 parts by weight of boric acid powder, 0.3 parts by weight of foam stabilizer (L5420 by Union Carbide) and 30 parts by weight of polymeric MDI (PAPI 27 by DOW) are mixed. The mixture slowly expands to about 2.5 lbs./cu. ft. and solidifies to produce a closed cell rigid foam.

The foam was flame tested after 1 week by using a ½ inch propane torch. The flame was held about 1 inch from the foam for 15 seconds. The foam slowly burned and formed a char and as soon as the char formed the flame went out. The charred area could be further heated and would not burn.

EXAMPLE 8

Example 7 is modified wherein 0.2 parts by weight of tin octoate (DABCO T$_{12}$ by Air Products) is added to the polyol, and a polyol selected from the list below is used in place of the sucrose polyether polyol:
a) sucrose amine polyol, hydroxyl no. 413;
b) phenyl amine polyol, hydroxyl no. 350;
c) poly (oxyalkylene) polyol, hydroxyl no. 380;
d) polyester polyol hydroxyl no. 275;
e) aromatic polyester polyol, hydroxyl no. 405;
f) chlorinated polyhydroxypolyether, hydroxyl no. 193;
g) methyl glycoside-based polyol, hydroxyl no. 240;
h) phenol-formaldehyde resin, hydroxyl no. 140;

i) aromatic polyol, hydroxyl no. 375;
j) sorbitol-based polyol, hydroxyl no. 490;
k) polypropylene polyol, hydroxyl no. 380;
l) phosphorus-containing polyol (VIROL-82 by MOBIL) hydroxyl no. 205;
m) mixtures of the above.

EXAMPLE 9

Example 8 is modified wherein 0.2 parts by weight of an amine polyurethane catalyst (DABCO R8020 by Air Products) is added to the polyol.

EXAMPLE 10

Example 8 is modified wherein 3 parts by weight of a blowing agent, trichlorofluoromethane, is added to the polyol.

EXAMPLE 11

Example 7 is modified wherein varying amount of boric acid powder is used and selected from the amount listed below:
a) 3 parts by weight
b) 6 parts by weight
c) 10 parts by weight
d) 15 parts by weight
e) 20 parts by weight
f) 25 parts by weight

EXAMPLE 12

Example 8 is modified wherein 3 parts by weight of a phase-change material, a mixture of paraffin waxes with a freezing (solidifying) point of about 70° F. and a melting point of about 72° F., is added in a liquid form and emulsified with the polyol.

EXAMPLE 13

Example 1 is modified wherein the tolylene diisocyanate is first reacted with 0.5 parts by weight of propylene glycol thereby producing a tolylene diisocyanate prepolymer and used in place of the tolylene diisocyanate.

EXAMPLE 14

Example 1 is modified wherein another low molecular weight compound replaced 50 percent of the ethylene glycol and is selected from the list below:
a) polypropylene glycol
b) glycerol
c) diethylene glycol
d) ethanol
e) methanol
f) dipropylene glycol
g) water
h) ethanolamine
i) ethylene chlorohydrin
j) trimethylol propane
k) formaldehyde
l) mixtures of the above.

EXAMPLE 15

Example 8 is modified wherein 0.5 parts by weight of a low molecular weight compound is added to the polyol and selected from the list below:
a) water
b) ethylene glycol
c) propylene glycol
d) glycerol
e) trimethyol propane
f) ethanolamine
g) ethanol
h) methanol
i) ethylene chlorohydrin
j) formaldehyde
k) diethylene glycol
l) dipropylene glycol
m) mixtures of the above.

EXAMPLE 16

Tolylene diisocyanate is reacted with hydroxyethyl methacrylate to produce a NCO-terminated prepolymer, then 30 parts by weight of the prepolymer is mixed with 6 parts by weight of boric acid, 0.5 parts by weight of triethylamine, 0.2 parts by weight of tin octoate and a catalytic amount of organic hydroperoxide. The mixture cures into a flame-retardant microcellular foam.

EXAMPLE 17

About 30 parts by weight of a polyepoxy resin (glycidyl ether of dihydric phenol), 1 parts by weight of ethylene glycol, 0.3 parts by weight of foam stabilizer (L5420 by UNION CARBIDE), 0.5 parts by weight of an amine urethane catalyst (DABCO R8020 by AIR PRODUCTS), 5 parts by weight of boric acid powder and 0.05 parts by weight of tin octoate are mixed. This mixture is then mixed with 30 parts by weight of polymeric MDI (MONDUR MR by MOBAY). The mixture slowly expands to produce a strong rigid foam of about 2-3 lbs./cu. ft.

EXAMPLE 18

Example 17 is modified wherein the polyepoxy resin is a phenol-formaldehyde resin containing epoxide radicals.

EXAMPLE 19

Example 17 is modified wherein 5 parts by weight of a polypropylene triol (POLY G 32-56 by OLIN) is added with the polyepoxy resin.

EXAMPLE 20

Example 1 is modified for comparison studies wherein the low molecule weight compound (ethylene glycol) was left out and when the components were mixed a very poor uncured, slightly expanded foam was produced.

EXAMPLE 21

Example 1 was modified for comparison studies wherein the organo metal catalyst (tin octoate) was left out and when the components were mixed a very poor uncured, slightly expanded foam was produced.

EXAMPLE 22

Example 1 was modified for comparison studies wherein the organo-metal catalyst (tin octoate) and ethylene glycol was left out and when the components were mixed it remained as a thick liquid.

EXAMPLE 23

Example 1 is modified wherein 20 parts by weight of a filler selected from the list below was added to the polyol:
a) silica powder
b) fiberglass powdered fibers
c) polystyrene powder
d) nylon powder e) polyethylene powder
f) polyvinyl chloride powder
g) expanded glass
h) sand
i) polycarbonate powder
j) mixtures of the above.

EXAMPLE 24

Example 7 is modified wherein 5 parts by weight of a modifying compound is added and selected from the list below:
a) urea-formaldehyde powder
b) phenol-formaldehyde powder
c) styrene oxide
d) furfural-ketone resin
e) phthalate esters
f) polyester benzoate
g) polyester resin with peroxide catalyst
h) rosin acid
i) mixtures of the above

EXAMPLE 25

About 30 parts by weight of sucrose polyether polyol, hydroxyl no. 380, 10 parts by weight of boric oxide, 2 parts by weight of water, 0.3 parts by weight of foam stabilizer (L5420 by Union Carbide) and 0.05 parts by weight of tin octoate are emulsified then 30 parts by weight of a polymeric MDI (MONDUR MR by MOBAY) are thoroughly mixed with the emulsion. The mixture expands and cures into a rigid flame-retardant polyurethane foam of about 2 lbs./cu. ft.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. The process of preparing flame-retardant polyurethane foam which process consist of mixing and reacting the following components:
   (A) an acidic boron compound, in the amount of 10 to 100 parts by weight;
   (B) compound with a molecular weight below 100 that has 1 or more active hydrogen that will react with isocyanate radicals and selected from the group consisting of water, organic compounds and mixtures thereof, in the amount up to 20 parts by weight;
   (C) organic polyhydroxy compounds with a molecular weight above 100, in the amount of 1 to 200 parts by weight;
   (D) organic polyisocyanate, in the amount of 25 to 100 parts by weight;
   (E) organo-metal polyurethane catalyst in the amount up to 10 percent by weight, based on weight of reaction mixture.

2. The foamed product produced by the process of claim 1.

3. The process of claim 1 wherein the acidic boron compound is boric acid.

4. The process of claim 1 wherein up to 50 percent by weight of an inert liquid, boiling in the range of $-25°$ C. to $80°$ C., is included in the reaction mixture as a blowing agent and the reaction proceeds with concomitant foaming.

5. The product produced by the process of claim 4.

6. The process of claim 1 wherein up to 10 percent by weight of an amine polyurethane catalyst is included in the reaction mixture.

7. The process of claim 1 wherein up to 20 percent by weight of a foam stabilizer is included in the reaction mixture.

8. The process of claim 1 wherein up to 20 percent by weight of emulsifying agent is included in the reaction mixture.

9. The process of claim 1 wherein an inorganic or organic particulate or pulverulent material is included in the reaction mixture.

10. The process of claim 1 wherein up to 25 percent by weight of phase-change material selected from the group consisting of crystalline alkyl hydrocarbons, fatty acids, fatty acid esters, poly(ethylene glycol) wax and mixtures thereof, are added to the components, percentage based on weight of the reaction mixture.

11. The process of claim 1 wherein a compound with epoxide radicals is used as Component (C).

12. The process of claim 1 wherein organic polyisocyanate is replaced with an organic isocyanate compound containing 1 or more unsaturated bonds which will polymerize and a catalytic amount of a free-radical initiator.

13. The flame-retardant polyurethane foam produced by the process consisting of mixing and reacting the following components:
   (A) boric acid
   (B) ethylene glycol
   (C) organic polyol with molecular weight of above 200
   (D) organic polyisocyanate
   (E) organic-tin compound
   (F) foam stabilizer.

14. The flame-retardant polyurethane foam produced by the process consisting of mixing and reacting the following components:
   (a) boric acid
   (b) organic polyol with a hydroxyl number above 200
   (c) organic polyisocyanate
   (d) foam stabilizer 15. The flame-retardant polyurethane foam produced by the process consisting of mixing and reacting the following components:
   (A) boric acid
   (B) organic compound containing hydroxyl radicals and has a molecular weight below 100
   (C) organic polyol with a molecular weight above 100
   (D) organic polyisocyanate
   (E) organo-tin urethane catalyst
   (F) foam stabilizer.

16. The process of claim 1 wherein components A, B and C are first emulsified.

17. The process of claim 1 wherein boron oxide is used as Component A and water is used as Component B.

18. The flame-retardant polyurethane product produced by the process consisting of mixing and reacting the following components:

(A) acidic boron compound, in the amount of 10 to 100 parts by by weight;

(B) compound with a molecular weight below 100 that has 1 or more active hydrogen that will react with isocyanate radicals and selected from the group consisting of water, organic compounds and mixtures thereof, in the amount up to 20 parts by weight;

(C) polyhydroxy compounds with a molecular weight above 100, selected from the group consisting of polyether polyols produced by the polymerization of ethylene oxide, propylene oxide, butylene oxide, tetrahydrofurane oxide, styrene oxide epichlorohydrin, each with itself or by addition of these epoxides as mixtures or successively, to starting components selected from the group consisting of water, ethylene glycol, propylene-1,3- or -1,2-glycol, trimethylol propane, 4-4-dihydrodiphenyl propane, aniline, ammonia, ethanolamine or ethylenediamine and sucrose; organic polyether; organic polyethers modified with vinyl polymers; organic polyethers modified with polybutadienes; polythioether polyols; organic polyacetal polyol; organic polycarbonate polyols; organic polyester amide polyols; organic hexane polyols; organic neopentyl polyols; pentraerythritol; quinitol; mannitol; sorbitol; methyl glycoside; organic polybutadiene polyols; and organic polypropylene polyols modified with vinyl polymers; in the amount of 25 to 100 parts by weight;

(D) organic polyisocyanate, in the amount of 25 to 100 parts by weight;

(E) organo-metal polyurethane catalyst, in the amount up to 10 percent by weight, based on the weight of the reaction mixture.

19. The flame-retardant polyurethane product of claim 18 wherein the acidic boron compound is boric acid.

20. The flame-retardant polyurethane product of claim 18 wherein up to 50 percent by weight of an inert liquid, boiling in the range of −25° C. to 80° C., is included in the reaction mixture as a blowing agent and the reaction proceeds with concomitant foaming.

21. The flame-retardant polyurethane product of claim 18 wherein up to 10 percent by weight of an amine polyurethane catalyst is included in the reaction mixture.

22. The flame-retardant polyurethane product of claim 18 wherein up to 20 percent by weight of a foam stabilizer is included in the reaction mixture.

23. The flame-retardant polyurethane product produced by the process consisting of mixing and reacting the following components:

(A) acidic boron compound, in the amount of 10 to 100 parts by weight;

(B) compound with a molecular weight below 100 that has 1 or more active hydrogen that will react with isocyanate radicals and selected from the group consisting of water, organic compounds and mixtures thereof, in the amount up to 20 parts by weight;

(C) organic polyol with a molecular weight above 100, in the amount of 25 to 200 parts by weight;

(D) organic polyisocyanate, in the amount of 25 to 100 parts by weight;

(E) organo-metal polyurethane catalyst, in the amount up to 10 percent by weight, based on the weight of the reaction mixture.

24. The flame-retardant polyurethane product of Claim 23 wherein up to 50 percent by weight of inert liquid, boiling in the range of −25° C. to 80° C., is included in the reaction mixture as a blowing agent and up to 20 percent by weight of a foam stabilizer is included in the reaction mixture and the reaction proceeds with concomitant foaming.

* * * * *